July 22, 1958 G. HERR ET AL 2,844,200
PADDED MATERIAL CONSTRUCTION FOR SUN VISOR
Filed Nov. 15, 1956
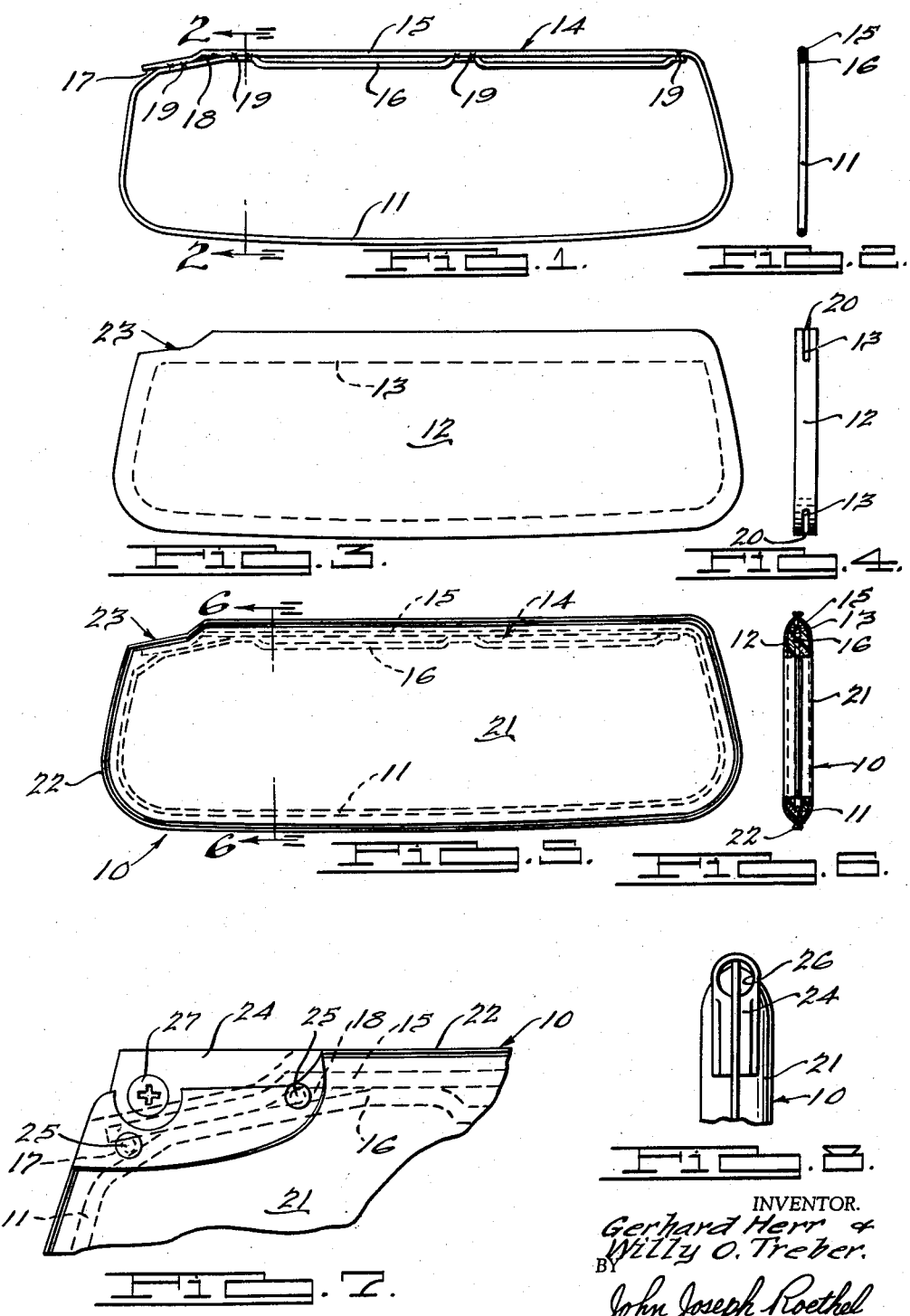
INVENTOR.
Gerhard Herr &
Willy O. Treber.
BY John Joseph Roethel
ATTORNEY.

United States Patent Office 2,844,200
Patented July 22, 1958

2,844,200

PADDED MATERIAL CONSTRUCTION FOR SUN VISOR

Gerhard Herr, Wuppertal-Vohwinkel, and Willy O. Treber, Wuppertal-Elberfeld, Germany, assignors to Gebruder Happich-G. m. b. H., Wuppertal-Elberfeld, Germany Application November 15, 1956, Serial No. 622,387

Claims priority, application West Germany March 26, 1956

3 Claims. (Cl. 160—354)

This invention relates to a sun visor especially adapted for use in vehicles, particularly in motor cars, as a protection against intruding blinding sun rays. More particularly, the present invention relates to an improved sun visor of elastic design and material.

The present application is a continuation-in-part of our co-pending application Ser. No. 572,997, filed March 21, 1956. The object of the invention disclosed in our co-pending application was to provide a sun visor which is substantially elastic in construction, that is, one which is deformable in any direction with little resistance and which elastically reacts to pressure. The aim was to provide a sun visor capable of acting as a crash pad to prevent injury to the occupants of the vehicle in case of accident. Briefly, our co-pending application disclosed a sun visor consisting of a bag made of resilient material containing a resilient frame.

The present invention relates to an improvement of the sun visor with a view to simplifying the fabrication of the visor and to providing a structure more resistant to vibrational distortion. To attain the desired result, an object of the invention is to provide an elastic or resilient frame forming a closed loop, one side of the loop being reinforced to provide an axis resistant against torsion. Further, the body of the visor comprises a single padded leaf which is circumferentially slotted to receive the resilient frame, the latter being placed within the periphery of the padded leaf. The edge walls of the frame receiving slot are coated with a suitable gum or adhesive so that they adhere to each other enclosing the frame. A suitable covering material is provided completely concealing the padded interior material. The resilient frame is provided with a reinforced top shank adapted to receive the fastening clip forming the pivot bearing by means of which the visor is adapted to be mounted within the vehicle.

The reinforced top shank of the frame is provided by longitudinally overlapping portions of the wire frame. The frame portions are placed one on top of the other and spot welded together. The top shank so formed provides a torsionally resistant support bridge. At one upper corner of the frame, the overlapping portions are formed to provide rivet or screw receiving openings. The fastening or mounting clip is fitted over the formed frame corner and is securely and rigidly attached thereto by rivets or the other fastening means. It is an object to maintain the visor in any position of adjustment despite the normal vibratory forces encountered as the vehicle is driven about.

Further objects, advantages and features of construction embodying the present invention and the methods of carrying out the same will be apparent from the following description and appended claims, reference being had to the accompanying drawings forming a part of this specification wherein like reference numerals designate corresponding parts in the several views.

Fig. 1 is a lateral elevation of the wire frame of the sun visor embodying the present invention.

Fig. 2 is a sectional view taken substantially through line 2—2 of Fig. 1 looking in the direction of the arrows.

Fig. 3 is a lateral view of the padding leaf of the visor.

Fig. 4 is an end view of Fig. 3.

Fig. 5 is a lateral view of the finished sun visor.

Fig. 6 is a sectional view in part fragmentary taken substantially through line 6—6 of Fig. 5 looking in the direction of the arrows.

Fig. 7 is a fragmentary enlarged view illustrating the visor mounting clip and its manner of attachment to the visor.

Fig. 8 is an end view of Fig. 7 looking at the same from the left end as viewed in Fig. 7.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the drawing there is illustrated, by way of example, an embodiment of the present invention comprising a sun visor, generally designated 10. The sun visor 10 is provided with a resilient frame member 11, preferably made of a suitable metal having spring characteristics. Covering the frame member 11 is a padding member 12, the latter being preferably manufactured of a lightweight foam plastic material. As shown in Figs. 3 and 4, the padding member is provided with a peripherally extending slot 13 adapted to receive the frame member 11.

As shown in Figs. 1 and 2, the frame member 11 is formed as a closed loop having a reinforced shank or top portion 14. The top portion 14 comprises the two free end sections 15 and 16 which are positioned and extended so that the section 15 overlies the section 16 in parallel relationship. It will be noted that the overlapping sections at the left end of the frame, as viewed in Figs. 1 and 7 are deformed to provide pockets 17 and 18 for a purpose to be hereinafter explained.

At suitable intervals, as indicated by the reference numeral 19, the substantially parallel wire sections are spot welded to each other. Thus, the upper or shank portion 14 of the frame is formed with a high degree of resistance to torsional deflection.

The width and length dimensions of the padding member 12 are such that the frame member 11 when placed within the slot 13 is covered by the padding member as shown in Figs. 5 and 6.

That is, the edges 20 of the slot 13 extend beyond or outwardly of the frame. Preferably, a gun or adhesive material is applied to the edges 20 so that they may be sealed together thereby completely embedding the frame member 11 within the padding member 12.

The padding member 12 having the frame 11 embedded therein is then covered by a suitable plastic foil material 21. The plastic foil material is placed on each side of the padding member. The assembly is held in a suitable die and the foil edges are united, preferably by a continuous weld seam 22. The foil material exteriorly of the seam is trimmed off leaving the sun visor with a contour substantially as shown in Figs. 5 and 6.

It will be noted that the sun visor is of substantially symmetrical contour except at the upper left hand corner thereof, as viewed in Fig. 5. This upper corner is provided with a recess 23 adapted to receive the mounting device 24. The mounting device is held in place by two rivets 25, one of which passes through the pocket 17 and the other of which passes through the pocket 18 formed in the frame. The fastening device is provided with a longitudinally extending opening 26 adapted to receive the end of a conventional sun visor mounting rod (not shown). Screw means 27 are provided to squeeze the sides of the mounting device toward one another so that the mounting device may be swivelly clamped around the mounting rod.

By securing the fastening device 25 to the frame in the manner described, the mounting device and the reinforced upper frame member 14 provide a structure adapted to properly maintain the sun visor in a flat or horizontal inoperative position. That is, the visor will be held against any tendency to swing or twist downwardly because of its deadweight even if the vehicle is driven over roads causing excessive vehicular vibrations. Further, the construction of the frame is sufficiently rigid to permit the visor to be grasped at any point when it is desired to move the visor from a horizontal to a vertical position or vice versa. The reinforced upper frame portion 14 will transmit the turning movement of the visor to the fastening device causing the latter to turn on its supporting rod or to turn the supporting rod in its bearing if such a device is used.

We claim:

1. A sun visor comprising a padding member made of resilient foam plastic, said padding member being provided with a peripheral slot therearound, a resilient wire frame member seated within said slot, said frame member comprising a substantially rectangular loop the top portion of which comprises two sections of wire overlying each other in the plane of said loop to provide a reinforced support bridge, said overlying wire sections at one corner of said loop being formed to provide pocket portions, an exterior plastic foil covering material housing said padding member and wire frame therewithin, a clamping device, and means passing through said clamping device and frame pocket portions securing said clamping device to said visor.

2. A sun visor comprising a padding member made of resilient foam plastic, said padding member being provided with a peripheral slot therearound, a resilient wire frame member seated within said slot, the edges of said slot being sealed together after insertion of said frame member, the latter thereby being contained within said padding member, said frame member comprising a substantially rectangular loop the top portion of which comprises two sections of wire overlying each other in the plane of said loop to provide a reinforced support bridge, said overlying wire sections at one corner of said loop being formed to provide pocket portions, an exterior plastic foil covering material housing said padding member and wire frame therewithin, a clamping device, and means passing through said clamping device and frame pocket portions securing said clamping device to said visor.

3. A sun visor comprising a padding member made of resilient foam plastic, said padding member being provided with a peripheral slot therearound, a resilient wire frame member seated within said slot, said frame member comprising a substantially rectangular loop the top portion of which comprises two sections of wire overlying each other in the plane of said loop to provide a reinforced support bridge, said overlying wire sections at one corner of said loop being formed to provide rivet receiving pocket portions, an exterior plastic foil covering material housing said padding member and wire frame therewithin, a clamping device, and rivet means passing through said clamping device and frame pocket portions securing said clamping device to said visor, said clamping device having a longitudinally extending opening therein substantially in alignment with the top portion of said frame loop.

References Cited in the file of this patent

UNITED STATES PATENTS

| 2,201,197 | Minor | May 21, 1940 |
| 2,201,378 | Schoenheit | May 21, 1940 |
| 2,424,500 | Peltier et al. | July 22, 1947 |
| 2,506,689 | Simpson et al. | May 9, 1950 |
| 2,560,009 | Straith | July 10, 1951 |
| 2,589,866 | Roberts | Mar. 18, 1952 |

FOREIGN PATENTS

| 1,123,335 | France | June 11, 1956 |